United States Patent
Liu et al.

(10) Patent No.: US 9,449,368 B2
(45) Date of Patent: Sep. 20, 2016

(54) METHOD, SYSTEM AND MOBILE TERMINAL FOR INFORMATION DISPLAYING

(71) Applicant: Tencent Technology (Shenzhen) Company Limited, Shenzhen (CN)

(72) Inventors: Yongxia Liu, Shenzhen (CN); Xuebin Liu, Shenzhen (CN); Jiejun Zhang, Shenzhen (CN); Kaixiang Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 81 days.

(21) Appl. No.: 14/270,844

(22) Filed: May 6, 2014

(65) Prior Publication Data

US 2014/0240361 A1   Aug. 28, 2014

Related U.S. Application Data

(63) Continuation of application No. PCT/CN2013/087949, filed on Nov. 27, 2013.

(30) Foreign Application Priority Data

Jan. 30, 2013  (CN) .......................... 2013 1 0037461

(51) Int. Cl.
*G09G 5/00*   (2006.01)
*G06T 3/40*   (2006.01)
*H04W 8/24*   (2009.01)
*H04L 29/08*  (2006.01)

(52) U.S. Cl.
CPC ............. *G06T 3/4092* (2013.01); *H04L 67/04* (2013.01); *H04L 67/10* (2013.01); *H04L 67/303* (2013.01); *H04W 8/24* (2013.01)

(58) Field of Classification Search
None
See application file for complete search history.

(56) References Cited

U.S. PATENT DOCUMENTS

2013/0147845 A1* 6/2013 Xie ........................... G06F 3/14
                                                      345/660
2013/0198342 A1* 8/2013 Xu .......................... H04L 65/60
                                                      709/219

FOREIGN PATENT DOCUMENTS

| CN | 101833586 A | 9/2010 |
| CN | 101937428 A | 1/2011 |
| CN | 102436484 A | 5/2012 |

* cited by examiner

Primary Examiner — Kyle Zhai
(74) Attorney, Agent, or Firm — Patterson & Sheridan, LLP

(57) ABSTRACT

A method, system and mobile terminal for information displaying are provided. The method is applied to a system that includes a cloud server and at least one mobile terminal, the method including: reporting, by the mobile terminal, its attribute information to the cloud server, the attribute information includes screen density of the mobile terminal and screen width of the mobile terminal; typesetting, by the cloud server, information to be displayed of the mobile terminal, based on the screen density and the screen width, and returning the typeset information to the mobile terminal to display. Since typesetting information of the cloud server is typeset according to the attribute information reported by the mobile terminal, displaying information of the mobile terminal may be adapted to the screen density of the mobile terminal.

10 Claims, 2 Drawing Sheets

METHOD, SYSTEM AND MOBILE TERMINAL FOR INFORMATION DISPLAYING

CROSS-REFERENCE TO RELATED APPLICATIONS

This application is a continuation application of International Application PCT/CN2013/087949 filed on Nov. 27, 2013, which claims the priority benefit of Chinese Patent Application No. 201310037461.1 filed on Jan. 30, 2013, the disclosures of which are incorporated by reference herein in their entirety for all intended purposes.

FIELD OF THE INVENTION

The disclosure relates to the field of information processing, and in particular, relates to a method, system and mobile terminal for information displaying.

BACKGROUND

Screen density refers to the number of pixels in a physical unit area of a screen. With continuous development of mobile terminals, the types of the screen density of mobile terminals are increasing. Usually, dpi (dots per inch) is used to represent screen density. Currently, common types of the screen density include low screen density (120 dpi), middle screen density (160 dpi), high screen density (240 dpi), ultra-high screen density (320 dpi), etc. The lower the screen density is less number of pixels are in the same screen area; in contrary, the higher the screen density is, more number of pixels are in the same screen area.

When information is displayed by an existing mobile terminal, the displayed content cannot be adjusted according to screen density of the mobile terminal. For example, for a same picture or text, its font size, controls, line spacing, image size may be suitable on mobile terminals with low screen density, but it may appear as too small and squeezed on mobile terminals with high screen density. In the latter case, some information being viewed on the screen may be too squeezed for a user to easily perform operations such as clicking, selecting, etc.

SUMMARY OF THE INVENTION

Embodiments of the disclosure intend to provide a method for displaying information so as to solve the problem that displayed content cannot be adjusted according to the screen density of the mobile terminal.

Embodiments of the disclosure are implemented as follows: a method for displaying information, the method being applied to a system that includes a cloud server and at least one mobile terminal, the method including:

reporting, by the mobile terminal, its attribute information to the cloud server, the attribute information includes screen density of the mobile terminal and screen width of the mobile terminal;

typesetting, by the cloud server, information to be displayed of the mobile terminal based on the screen density and the screen width, and returning the typeset information to the mobile terminal to display.

A method for displaying information, the method being applied to a mobile terminal, the method including:

reporting, by the mobile terminal, its attribute information to a cloud server, the attribute information includes screen density of the mobile terminal and screen width of the mobile terminal, so that the cloud server typesets information to be displayed of the mobile terminal based on the attribute information, and returns the typeset information to the mobile terminal;

receiving and displaying, by the mobile terminal, the typeset information returned by the cloud server.

Another intention of embodiments of the disclosure is to provide a system for displaying information, including:

a cloud server and at least one mobile terminal;

the mobile terminal is configured to report its attribute information to the cloud server; the attribute information includes screen density of the mobile terminal and screen width of the mobile terminal, the cloud server is configured to typeset information to be displayed of the mobile terminal based on the attribute information, and return the typeset information to the mobile terminal.

A mobile terminal, including:

a reporting unit configured to report its attribute information to a cloud server, the attribute information includes screen density of the mobile terminal and screen width of the mobile terminal, so that the cloud server typesets information to be displayed of the mobile terminal based on the screen density and the screen width, and returns the typesetting information to the mobile terminal; and a displaying unit configured to receive and display the typesetting information returned by the cloud server.

Compared with prior art, embodiments of the present disclosure have the following advantages: by reporting the attribute information of the mobile terminal by the mobile terminal, the cloud server can typeset the information to be displayed of the mobile terminal based on the screen density and the screen width, and return the typeset information to the mobile terminal to display. In embodiments of the present disclosure, the mobile terminal does not need to typeset the information to be displayed, typeset information is sent to the mobile terminal through the cloud server directly to display. Since the typeset information of the cloud server is typeset according to the attribute information reported by the mobile terminal, the displaying information of the mobile terminal may be adapted to the screen density of the mobile terminal, which is convenient for the user to browse and improves the user experience of browsing information.

DESCRIPTION OF THE DRAWINGS

In order to describe technical solutions of the disclosure more clearly, next, brief introduction will be made to the accompanying drawings which would be used in describing the embodiments and prior art. Apparently, the drawings described herein are just some embodiments of the disclosure; other drawings may be obtained based on these drawings by a person skilled in the art.

DETAILED DESCRIPTION

In order to make the intention, technical solutions and advantages of the disclosure clear, next, the disclosure will be further described in detail with reference to the accompanying drawings and embodiments. It should be understood that the specific embodiments described herein are intended to explain this disclosure instead of limiting it.

Next, the technical solutions of this disclosure will be described with reference to detailed embodiments.

Figure 1:
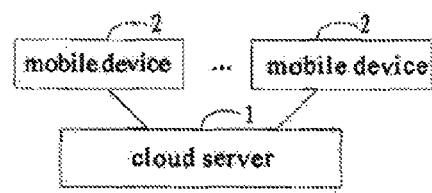
FIG. 1 is an application scenario graph suitable for a method for displaying information provided by one embodiment of the disclosure.

FIG. 1 is an application scenario graph suitable for a method for displaying information provided by one embodiment of the disclosure; for clarity, only the part that is related to the embodiment is shown.

The application scenario includes a cloud server 1 and at least one mobile terminal 2. The cloud server 1 is a cloud computing system, its core includes data storage and management, the cloud server 1 and the mobile terminal 2 communicate with each other through a network connection.

The mobile terminal 2 may be any terminal devices equipped with a network connection function, including but not limited to mobile phones, tablet computers, etc.

The cloud server 1 may be a single server, or a server terminal constituted by several functional servers together.

In this embodiment, the mobile terminal 2 reports its attribute information to the cloud server 1, the attribute information includes but not limited to: screen density of the mobile terminal 2, and screen width of the mobile terminal 2. The cloud server 1 typesets information to be displayed of the mobile terminal 2 based on the screen density and screen width reported by the mobile terminal 2, and returns the typeset information to the mobile terminal 2 to display.

Specifically, the cloud server 1 calculates the width of the initial typesetting area based on the screen density and screen width reported by the mobile terminal 2, and stores the width of the initial typesetting area. When receiving information displaying request (including page accessing request information sent by the mobile terminal) of the mobile terminal 2, the cloud server 1 obtains the stored width of the initial typesetting area corresponding to the mobile terminal 2, typesets information to be displayed of the mobile terminal 2 within the obtained initial typesetting area, and returns the typeset information to the mobile terminal 2 to display.

The step in which the cloud server 1 calculates the width of the initial typesetting area based on the screen density and screen width specifically includes:

when the screen density is greater than a first predetermined value (e.g., the middle screen density):

$$DestScreenWidth = \frac{ScreenWidth \times m_1}{ScreenDensity},$$

when the screen density is less than or equal to the first predetermined value:

DestScreenWidth=ScreenWidth, wherein DestScreenWidth represents the width of the initial typesetting area; ScreenWidth represents the screen width; ScreenDensity represents the screen density; and $m_1$ represents the first predetermined value.

Further, the cloud server 1 may typeset the information to be displayed based on the following equations according to the screen density, the screen width and parameter values of the information to be displayed (obtained by parsing the information to be displayed):

when the screen density is greater than a second predetermined value:

$$DestValue = \frac{Value \times ScreenDensity}{m_2},$$

when the screen density is less than or equal to the second predetermined value:

DestValue=Value, wherein DestValue represents the location and/or the size of the information to be displayed within the initial typesetting area; Value represents the parameter values of elements in the information to be displayed; ScreenDensity represents the screen density; and $m_2$ represents the second predetermined value.

Moreover, in order to obtain a better typesetting effect, the cloud server 1 is further configured to recalculate the width of the initial typesetting area based on the following equations according to the screen density, the screen width and the width of the initial typesetting area before returning the typeset information to the mobile terminal:

when the screen density is greater than a second predetermined value:

$$DestScreenWidth1 = \frac{DestScreenWidth \times ScreenDensity}{m_2},$$

when the screen density is less than or equal to the second predetermined value:

DestScreenWidth1=DestScreenWidth, wherein DestScreenWidth1 represents the recalculated width of the initial typesetting area; DestScreenWidth represents the width of the initial typesetting area; ScreenDensity represents the screen density; and $m_2$ represents the second predetermined value.

It should be noted that the first predetermined value and the second predetermined value in this embodiment may be the same or different.

The application scenario provided by this embodiment is intended to explain the disclosure only; it does not define the protection scope of the disclosure.

Figure 2:
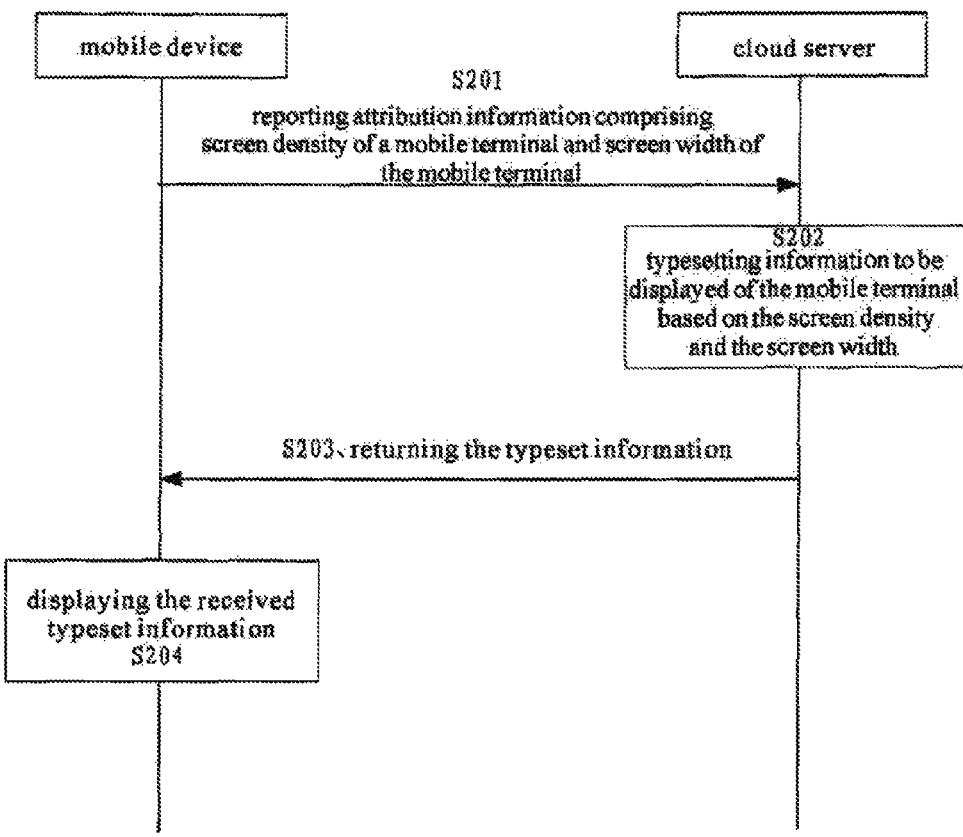
FIG. 2 is an interactive flowchart of a method for displaying information provided by one embodiment of the disclosure.

FIG. 2 is an interactive flowchart of a method for displaying information provided by another embodiment of the disclosure; process of the method is described in detail as follows:

In step S201, a mobile terminal reports its attribute information to a cloud server.

In this embodiment, the attribute information may include but not limited to: screen density of the mobile terminal, screen width of the mobile terminal, a unique identifier of the mobile terminal, etc.

In practice, the cloud server may build up a mapping table for recording attribute information reported by various mobile terminals.

In step 202, the cloud server typesets information to be displayed of the mobile terminal based on the screen density and the screen width.

Specifically, the cloud server calculates the width of the initial typesetting area suitable for the mobile terminal based on the screen density and screen width, and typesets information to be displayed of the mobile terminal within the initial typesetting area.

Exemplarily, the width of the initial typesetting area suitable for the mobile terminal may be calculated by the embodiment based on the following equations.

When the screen density is greater than a first predetermined value:

$$DestScreenWidth = \frac{ScreenWidth \times m_1}{ScreenDensity},$$

when the screen density is less than or equal to the first predetermined value:

DestScreenWidth=ScreenWidth, wherein DestScreenWidth represents the width of the initial typesetting area; ScreenWidth represents the screen width; ScreenDensity represents the screen density; and $m_1$ represents the first predetermined value.

For example, if the screen density is greater than the middle screen density (e.g., 160 dpi), the typesetting area of the mobile terminal is zoomed out. For example, if the screen density of the mobile terminal is 240 dpi and the screen width is 480, then the calculated width of the initial typesetting area=480*160/240=320 (representing that there are 320 pixel points in one line), that is, the cloud server typesets the information to be displayed according to the area width of 320. If the screen density is less than or equal to the middle screen density, typesetting is executed according to the screen width. For example, if the screen density of the mobile terminal is 160 dpi and the screen width is 480, then the calculated width of the initial typesetting area=480, that is, the cloud server typesets the information to be displayed according to the area width of 480; and if the screen density of the mobile terminal is 120 dpi and the screen width is 480, then the calculated width of the initial typesetting area=480, that is, the cloud server typesets the information to be displayed according to the area width of 480.

Exemplarily, the cloud server may also typeset the information to be displayed based on the following equations.

When the screen density is greater than a second predetermined value:

$$DestValue = \frac{Value \times ScreenDensity}{m_2},$$

when the screen density is less than or equal to the second predetermined value:

DestValue=Value, wherein DestValue represents the location and/or the size of the information to be displayed within the initial typesetting area; Value represents the parameter values of elements in the information to be displayed; ScreenDensity represents the screen density; and $m_2$ represents the second predetermined value.

For example, when the screen density of the mobile terminal is 240 dpi, the screen width is 480, the parameter values of certain picture information are (10, 10, 20, 40), wherein the first 10 represents the horizontal offset coordinate of the image, the second 10 represents the vertical offset coordinate of the image, 20 represents the image width, and 40 represents the image height. The typeset value of the image according to the aforementioned typesetting equations is (15, 15, 30, 60).

It should be noted that parameter values of the information to be displayed include but not limited to at least one of the followings: horizontal offset coordinate, vertical offset coordinate, width, height, font size, line spacing, etc. The parameter values of the information to be displayed may be obtained by parsing the information to be displayed, for example, parameter values of information, such as images, text, controls, etc. in a web page may be obtained from the web page by parsing source code of the web page.

In step S203, the cloud server returns the typeset information to the mobile terminal.

Preferably, in order to further improve the displaying effect of the information, and to make it convenient to zoom in or zoom out the information to be displayed as a whole, the embodiment further includes the following operations before the cloud server returns the typeset information to the mobile terminal.

When the screen density is greater than a second predetermined value:

$$DestValue = \frac{Value \times ScreenDensity}{m_2},$$

when the screen density is less than or equal to the second predetermined value:

DestValue=Value, wherein DestValue represents the location and/or the size of the information to be displayed within the initial typesetting area; Value represents the parameter values of elements in the information to be displayed; ScreenDensity represents the screen density; and $m_2$ represents the second predetermined value.

In step S204, the mobile terminal receives and displays the typeset information returned by the cloud server.

In this embodiment, when a mobile terminal is displaying information, the mobile terminal does not need to typeset the information to be displayed, typeset information is sent to the mobile terminal through a cloud server directly to display. Since the typesetting information of the cloud server is typeset according to the attribute information reported by the mobile terminal, displaying information of the mobile terminal may be adapted to the screen density of the mobile terminal. It is proved in practice that there is significant improvement in displaying effect of the information that has been processed according to aforementioned method, which is convenient for the user to browse and improves user experience of browsing information.

Figure 3:
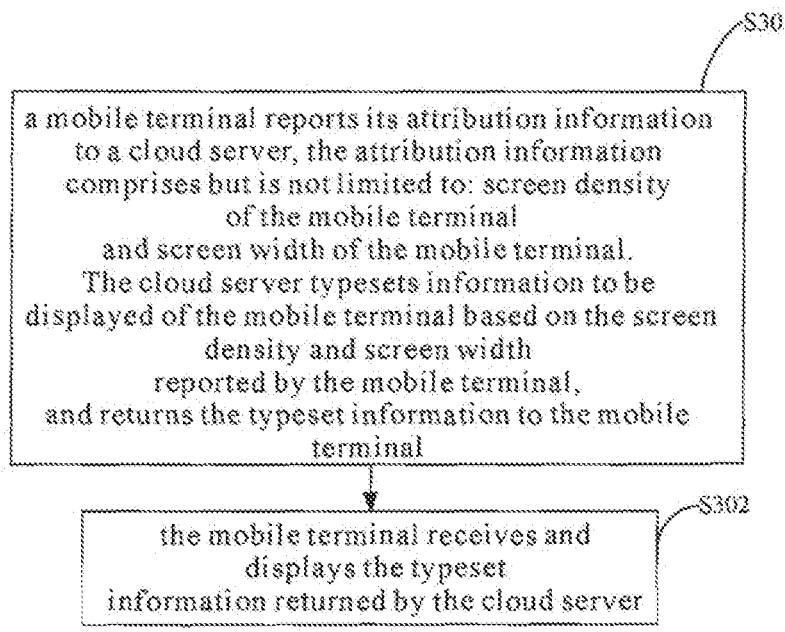
FIG. 3 is an implementation flowchart of a method for displaying information provided by one embodiment of the disclosure.

FIG. 3 is an implementation flowchart of a method for displaying information provided by another embodiment of the disclosure; the entity that performs the method is the mobile terminal in the system shown in FIG. 1, the method is described in detail as follows:

In step S301, a mobile terminal reports its attribute information to a cloud server; the attribute information includes but is not limited to: screen density of the mobile terminal and screen width of the mobile terminal. The cloud server typesets information to be displayed of the mobile terminal based on the screen density and screen width reported by the mobile terminal, and returns the typeset information to the mobile terminal.

In this embodiment, the attribute information may include but not limited to: screen density of the mobile terminal, screen width of the mobile terminal, unique identifier for the mobile terminal, etc.

In this embodiment, the cloud server typesets information to be displayed of the mobile terminal based on the screen density and screen width, and returns the typeset information to the mobile terminal; this specific implementation process may be referred to the corresponding description of another embodiment, which is omitted here.

In step S302, the mobile terminal receives and displays the typeset information returned by the cloud server.

In this embodiment, the mobile terminal does not need to typeset the information to be displayed, typeset information is sent to the mobile terminal through the cloud server directly to display. Since typesetting information of the cloud server is typeset according to the attribute information reported by the mobile terminal, the displaying information of the mobile terminal may be adapted to the screen density of the mobile terminal.

Figure 4:
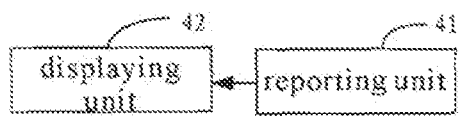
FIG. 4 is a composite structural diagram of a mobile terminal provided by one embodiment of the disclosure.

FIG. 4 is a composite structural diagram of a mobile terminal provided by another embodiment of the disclosure; for clarity, only the part that is related to the embodiment is shown.

The mobile terminal includes a reporting unit 41 and a displaying unit 43, wherein the specific functions of respective unit are as follows:

The reporting unit 41 is configured to report its attribute information to a cloud server, the attribute information includes screen density of the mobile terminal and screen width of the mobile terminal, so that the cloud server typesets information to be displayed of the mobile terminal based on the screen density and screen width, and returns the typeset information to the mobile terminal.

The displaying unit 43 is configured to receive and display the typeset information returned by the cloud server.

Further, the reporting unit 41 is specifically configured to: report its attribute information to the cloud server, the attribute information includes screen density of the mobile terminal and screen width of the mobile terminal, so that the cloud server calculates the width of an initial typesetting area suitable for the mobile terminal based on the screen density and screen width, typesets the information to be displayed of the mobile terminal within the initial typesetting area, and returns the typeset information to the mobile terminal to display.

Exemplarily, calculating the width of an initial typesetting area suitable for the mobile terminal based on the screen density and screen width by the cloud server includes:

When the screen density is greater than a first predetermined value (e.g., the middle screen density):

$$DestScreenWidth = \frac{ScreenWidth \times m_1}{ScreenDensity},$$

when the screen density is less than or equal to the first predetermined value:

DestScreenWidth=ScreenWidth, wherein DestScreenWidth represents the width of the initial typesetting area; ScreenWidth represents the screen width; ScreenDensity represents the screen density; and $m_1$ represents the first predetermined value.

Exemplarily, the cloud server may typeset the information to be displayed based on the following equations according to the screen density, the screen width and parameter values of the information to be displayed (obtained by parsing the information to be displayed):

when the screen density is greater than a second predetermined value:

$$DestValue = \frac{Value \times ScreenDensity}{m_2},$$

when the screen density is less than or equal to the second predetermined value:

DestValue=Value, wherein DestValue represents the location and/or the size of the information to be displayed within the initial typesetting area; Value represents the parameter values of elements in the information to be displayed; ScreenDensity represents the screen density; and $m_2$ represents the second predetermined value.

Moreover, in order to obtain a better typesetting effect, the cloud server 1 is further configured to recalculate the width of the initial typesetting area based on the following equations according to the screen density, the screen width and width of the initial typesetting area before returning the typeset information to the mobile terminal.

When the screen density is greater than a second predetermined value:

$$DestScreenWidth1 = \frac{DestScreenWidth \times ScreenDensity}{m_2},$$

when the screen density is less than or equal to the second predetermined value:

DestScreenWidth1=DestScreenWidth, wherein DestScreenWidth1 represents the recalculated width of the initial typesetting area; DestScreenWidth represents the width of the initial typesetting area; ScreenDensity represents the screen density; and $m_2$ represents the second predetermined value.

In the above description, the cloud server typesets information to be displayed of the mobile terminal based on the screen density and the screen width, but the present disclosure is not limited by this. For example, the attribute information sent by the mobile terminal can be the model of the mobile terminal. Typeset information corresponding to this model of the mobile terminal is stored at the server terminal. At this time, the cloud server typesets according to this pre-stored typeset information. There is no need to typeset based on the screen density and the screen width.

Also, depending on how to hold the mobile terminal, the width of the screen can also be the length of the screen or the diagonal length of the screen and etc.

Those skilled in the art may clearly understand that, for the convenience and simplicity of description, dividing into the aforementioned functional units is only taken as an example for description; in real application, the aforementioned functions may be divided to be realized by different functional units or modules. That is, dividing the internal structure of a mobile terminal into different functional units or modules, so as to realize all or part of functions described above. The functional units in the embodiments may be integrated into one processing unit, or respective functional unit may be separate physical entity, or two or more units may be integrated into one unit; the aforementioned integrated units may be implemented by employing either a form of hardware or a form of software functional units. In addition, specific names of respective functional units are intended only for the convenience of distinguishing from each other, they do not limit the protection scope of the present application. Specific working process of units in the mobile terminal may be referred to corresponding processes in the embodiments, which is omitted here.

As can be seen, in this embodiment, when a mobile terminal is displaying information, the mobile terminal does not need to typeset the displaying information, typeset information is sent to the mobile terminal through a cloud server directly to display. Since typesetting information of the cloud server is typeset according to the attribute information reported by the mobile terminal, displaying information of the mobile terminal may be adapted to the screen density of the mobile terminal. It is proved in practice that there is significant improvement in displaying effect of the information that has been processed according to aforementioned method, which is convenient for the user to browse and improves user experience of browsing information.

A person skilled in the art may also understand that all or part of steps of the aforementioned embodiments may be implemented through instructing corresponding hardware by a program, the program may be stored in a computer readable storage medium, such as ROM/RAM, disk, CD-ROM, etc.

The above disclosure is further detailed description of this disclosure according to specific preferred embodiments; specific embodiments of the present disclosure should not be regarded as being limited to such description. Those skilled in the art can make several equivalent substitutions or obvious modifications which have the same performance or purpose, without departing from the scope of the present disclosure. The substitutions or modifications are all within the patent protection scope defined by claims of the disclosure.

What is claimed is:

1. A method for displaying information, the method being applied to a system comprising a cloud server and at least one mobile terminal, the method comprising:
   reporting, by the mobile terminal, its attribute information to the cloud server, the attribute information comprising a screen density of the mobile terminal and a screen width of the mobile terminal;
   calculating, by the cloud server, a width of an initial typesetting area suitable for the mobile terminal based on the screen density and screen width;
   typesetting, by the cloud server, the information to be displayed of the mobile terminal within the initial typesetting area; and
   returning, by the cloud server, the typeset information to the mobile terminal, wherein the mobile terminal includes a display configured to receive and display the typeset information returned by the cloud server, wherein typesetting, by the cloud server, the information to be displayed of the mobile terminal within the initial typesetting area comprises:
   typesetting, by the cloud server, the information to be displayed based on the following equations, according to the screen density, the screen width and obtained parameter values of the information to be displayed, wherein,
   when the screen density is greater than a second predetermined value:

$$DestValue = \frac{Value \times ScreenDensity}{m_2};$$

when the screen density is less than or equal to the second predetermined value:

DestValue=Value;

wherein DestValue represents the location and/or the size of the information to be displayed within the initial typesetting area; Value represents the parameter values of the elements in the information to be displayed; ScreenDensity represents the screen density; and $m_2$ represents the second predetermined value.

2. The method according to claim 1, wherein the parameter values of the information to be displayed are obtained by parsing the information to be displayed, the parameter values comprising one or more of the followings: horizontal offset coordinate, vertical offset coordinate, width, height, font size, line spacing.

3. The method according to claim 1, wherein the method further comprises, before returning, by the cloud server, the typeset information to the mobile terminal to display:
   recalculating the width of the initial typesetting area based on the following equations according to the screen density, the screen width and the width of the initial typesetting area, wherein,
   when the screen density is greater than a second predetermined value:

$$DestScreenWidth1 = \frac{DestScreenWidth \times ScreenDensity}{m_2}$$

when the screen density is less than or equal to the second predetermined value:

DestScreenWidth1=DestScreenWidth;

wherein DestScreenWidth1 represents the recalculated width of the initial typesetting area; DestScreenWidth represents the width of the initial typesetting area; ScreenDensity represents the screen density; and $m_2$ represents the second predetermined value.

4. The method according to claim 1, wherein calculating, by the cloud server, the width of the initial typesetting area suitable for the mobile terminal based on the screen density and the screen width comprises:
   when the screen density is greater than a first predetermined value:

$$DestScreenWidth = \frac{ScreenWidth \times m_1}{ScreenDensity}$$

when the screen density is less than or equal to the first predetermined value:

DestScreenWidth=ScreenWidth;

wherein DestScreenWidth represents the width of the initial typesetting area; Screen Width represents the screen width; ScreenDensity represents the screen density; and $m_1$ represents the first predetermined value.

5. A method for displaying information, the method being applied to a mobile terminal, the method comprising:
   reporting, by the mobile terminal, its attribute information to a cloud server, the attribute information comprising a screen density of the mobile terminal and a screen width of the mobile terminal, so that the cloud server calculates a width of an initial typesetting area suitable for the mobile terminal based on the attribute information, typesets information to be displayed of the mobile terminal within the initial typesetting area, and returns the typeset information to the mobile terminal;
   wherein the mobile terminal includes a display configured to receive and display the typeset information returned by the cloud server, wherein the information to be displayed of the mobile terminal is typeset based on the following equations, according to the screen density, the screen width and obtained parameter values of the information to be displayed, wherein, when the screen density is greater than a second predetermined value:

$$DestValue = \frac{\text{Value} \times ScreenDensity}{m_2}$$

when the screen density is less than or equal to the second predetermined value:

DestValue=Value;

wherein DestValue represents the location and/or the size of the information to be displayed within the initial typesetting area; Value represents the parameter values of the elements in the information to be displayed; ScreenDensity represents the screen density; and $m_2$ represents the second predetermined value.

6. A system for displaying information, the system comprising:
a cloud server and at least one mobile terminal, wherein the mobile terminal includes a display configured to receive and display typeset information returned by the cloud server,
wherein the mobile terminal is configured to report its attribute information to the cloud server, the attribute information comprising a screen density of the mobile terminal and a screen width of the mobile terminal,
wherein the cloud server is configured to calculate a width of an initial typesetting area suitable for the mobile terminal based on the attribute information, typeset information to be displayed of the mobile terminal within the initial typesetting area, and return the typeset information to the mobile terminal, wherein the cloud server is configured to typeset the information to be displayed based on the following equations according to the screen density, the screen width and obtained parameter values of the information to be displayed, wherein,
when the screen density is greater than a second predetermined value:

$$DestValue = \frac{\text{Value} \times ScreenDensity}{m_2}$$

when the screen density is less than or equal to the second predetermined value:

DestValue=Value wherein DestValue represents the location and/or the size of the information to be displayed within the initial typesetting area; Value represents the parameter values of elements in the information to be displayed; ScreenDensity represents the screen density; and $m_2$ represents the second predetermined value.

7. The system according to claim 6, wherein the parameter values of the information to be displayed are obtained by parsing the information to be displayed, the parameter values comprising one or more of the followings: horizontal offset coordinate, vertical offset coordinate, width, height, font size, line spacing.

8. The system according to claim 6, wherein the cloud server is configured to recalculate the width of the initial typesetting area based on the following equations according to the screen density, the screen width and the width of the initial typesetting area, before returning the typeset information to the mobile terminal, wherein, when the screen density is greater than a second predetermined value:

$$DestScreenWidth1 = \frac{DestScreenWidth \times ScreenDensity}{m_2}$$

when the screen density is less than or equal to the second predetermined value:

DestScreenWidth1=DestScreenWidth;

wherein DestScreenWidth1 represents the recalculated width of the initial typesetting area; DestScreenWidth represents the width of the initial typesetting area; ScreenDensity represents the screen density; and $m_2$ represents the second predetermined value.

9. The system according to claim 6, wherein the cloud server is configured to calculate the width of the initial typesetting area suitable for the mobile terminal based on the screen density and the screen width, wherein, when the screen density is greater than a first predetermined value:

$$DestScreenWidth = \frac{ScreenWidth \times m_1}{ScreenDensity}$$

when the screen density is less than or equal to the first predetermined value:

DestScreenWidth=ScreenWidth;

wherein DestScreenWidth represents the width of the initial typesetting area; Screen Width represents the screen width; ScreenDensity represents the screen density; and $m_1$ represents the first predetermined value.

10. A mobile terminal, the mobile terminal comprising:
one or more processors configured to report the mobile terminal's attribute information to a cloud server, the attribute information comprising a screen density of the mobile terminal and a screen width of the mobile terminal, wherein the cloud server calculates a width of an initial typesetting area suitable for the mobile terminal based on the attribute information, typesets information to be displayed of the mobile terminal within the initial typesetting area, and returns the typeset information to the mobile terminal; and
a display configured to receive and display the typeset information returned by the cloud server,
wherein the information to be displayed of the mobile terminal is typeset based on the following equations, according to the screen density, the screen width and obtained parameter values of the information to be displayed, wherein,
when the screen density is greater than a second predetermined value:

$$DestValue = \frac{\text{Value} \times ScreenDensity}{m_2}$$

when the screen density is less than or equal to the second predetermined value:

DestValue=Value;

wherein DestValue represents the location and/or the size of the information to be displayed within the initial typesetting area; Value represents the parameter values of the elements in the information to be displayed; ScreenDensity represents the screen density; and $m_2$ represents the second predetermined value.

\* \* \* \* \*